United States Patent
Basile

[19]

[11] Patent Number: 5,914,963
[45] Date of Patent: Jun. 22, 1999

[54] CLOCK SKEW REDUCTION

[75] Inventor: Barry S. Basile, Houston, Tex.

[73] Assignee: Compaq Computer Corporation, Houston, Tex.

[21] Appl. No.: 08/667,618

[22] Filed: Jun. 21, 1996

[51] Int. Cl.[6] .............................. G06K 5/04; G06F 1/12; G06F 1/04
[52] U.S. Cl. ............................. 371/1; 395/552; 395/558
[58] Field of Search ................................... 371/1, 62, 61; 327/153, 156, 161, 162, 163, 277, 291, 236, 237, 244; 326/93, 96; 395/551, 552, 555, 558; 375/362, 364

[56] References Cited

U.S. PATENT DOCUMENTS

| 5,087,829 | 2/1992 | Ishibashi et al. | 307/269 |
| 5,398,262 | 3/1995 | Ahuja | 375/356 |
| 5,448,193 | 9/1995 | Baumert et al. | 327/156 |
| 5,463,337 | 10/1995 | Leonowich | 327/158 |
| 5,467,040 | 11/1995 | Nelson et al. | 327/276 |
| 5,486,783 | 1/1996 | Baumert et al. | 327/147 |
| 5,631,591 | 5/1997 | Bar-Niv | 327/158 |
| 5,661,425 | 8/1997 | Minoda et al. | 327/159 |

*Primary Examiner*—Trinh L. Tu
*Attorney, Agent, or Firm*—Sharp, Comfort & Merrett, P.C.

[57] ABSTRACT

A computer system has a skew compensation circuit for synchronizing the phase of a first periodic signal in one device with a second periodic signal in a second device connected to the first device by a connection that imposes a propagation delay. The skew compensation circuit has a receiver connected to receive the second periodic signal delayed by the propagation delay and circuitry for providing a delay signal representative of the propagation delay. The skew compensation circuit further includes a generator connected to generate the first periodic signal in phase with the second periodic signal based on the first periodic signal and the delay signal.

58 Claims, 7 Drawing Sheets

CLOCK SKEW REDUCTION

BACKGROUND

The invention relates to reducing clock skew.

As shown in FIGS. 1 and 2, in a computer system 10, a reference clock circuit 104 located in a base computer unit 100 is typically used to synchronize operations of a synchronous circuit 106 located in the base computer unit 100 with operations of a synchronous circuit 152 located in a remote computer unit 150. The reference clock circuit 104 furnishes a clock signal CLOCKA to a clock line 108 of a cable 130 extending between the base computer unit 100 and the remote computer unit 150. A clock signal, CLOCKB, received by the synchronous circuit 152 from the clock line 108 is skewed, or delayed, relative to the clock signal CLOCKA, by a propagation delay time $t_{pd}$.

Signals received and furnished by the synchronous circuit 152 are synchronized with the clock signal CLOCKB. If a clocked signal CLOCKED_SIGNAL1 is provided by the synchronous circuit 152 and transmitted over a signal line 110 of the cable 130, a corresponding clocked signal CLOCKED_SIGNAL2 received by the synchronous circuit 106 from the signal line 110 is delayed by two propagation delay times ($2 \cdot t_{pd}$) relative to the clock signal CLOCKA.

In order to compensate for the propagation delay time $t_{pd}$, an active or passive delay element is typically inserted in the clock line 108 of the cable 130 to increase the propagation delay so that the clock signals CLOCKA and CLOCKB are exactly an integral number of clock periods apart. The clock signals CLOCKA and CLOCKB then appear in phase. If either the frequency of the reference clock circuit 104 or the length of the cable 130 changes, then the delay element must be re-tuned.

SUMMARY

In general, in one aspect, the invention features a computer system having a compensation circuit for synchronizing the phase of a first periodic signal in one device with a second periodic signal in a second device connected to the first device by a connection that imposes a propagation delay. The compensation circuit has a receiver connected to receive the second periodic signal delayed by the propagation delay. The compensation circuit also has circuitry for providing a delay signal representative of the propagation delay and a generator connected to generate the first periodic signal in phase with the second periodic signal based on the first periodic signal and the delay signal.

Implementations of the invention may include one or more of the following features. The circuitry for providing the delay signal may have a conductor having a representative propagation delay that is twice the propagation delay. This conductor may be associated with a bus of the computer system. The generator may include a phase locked loop. The phase locked loop may have a reference input receiving a signal formed from the second periodic signal delayed by the propagation delay and an output providing a signal representative of the first periodic signal. The generator may include an averager which averages a signal formed from the first periodic signal with a signal representative of the delay signal. The averager may include a multiplexer.

In general, in another aspect, the invention features a computer system having a communication link and a source device connected to furnish a source timing signal to the communication link. The source timing signal is subject to a first propagation delay caused by the communication link. The computer system has a target device connected to receive the source timing signal from the communication link and circuitry connected to send and receive a second signal with a second propagation delay between the sending and receiving that has a predetermined relationship to the first propagation delay. The computer system also has circuitry connected to provide the source timing signal to the target device with a timing based on the second propagation delay.

Implementation of the invention may include one or more of the following features. The communication link may be a bus or a cable electrically coupled to the source and target devices. The source device may be a clock circuit, and the target device may be a bus. The buses may be Peripheral Component Interconnect buses.

A first conductor having a first length may introduce the first propagation delay and the circuitry connected to send and receive the second signal may include a second conductor having a length with a predetermined relationship to the first length. The first conductor and the second conductor may be part of a cable or part of a bus of the computer system.

In general, in another aspect, the invention features a method for use in a computer system for compensating for propagation delay in a signal passed from a signal source to a signal destination. The method includes sensing an amount of actual time delay indicative of the propagation delay and adjusting the phase of the signal as received from the signal source in accordance with the phase of the signal as sent from the signal source.

Implementation of the invention may include one or more of the following features. The step of sensing may use a delay channel connected to the signal destination and configured to impart the amount of actual time delay to the signal. The signal source and the signal destination may be connected by a communication channel where the delay channel has a propagation length corresponding to the propagation length of the communication channel. The propagation length of the delay channel may be a multiple of the propagation delay of the communication channel. The delay channel may have a conductor that is connected from the signal destination to the signal source and back to the signal destination. Adjusting may include processing the phases of two delay signals which appear respectively as an input signal and an output signal to the delay sensor.

In general, in another aspect, the invention features a compensation circuit for synchronizing the phase of a first periodic signal in one device with a second periodic signal in a second device connected to the first device by a connection that imposes a propagation delay. The compensation circuit has a receiver connected to receive the second periodic signal delayed by the propagation delay. The compensation circuit also has circuitry for providing a delay signal representative of the propagation delay and a generator connected to generate the first periodic signal in phase with the second periodic signal based on the first periodic signal and the delay signal.

Among the advantages of the invention are one or more of the following. Circuitry in the computer system is synchronized to one clock signal. The compensation circuit is independent of cable length and the frequency of operation. The compensation circuit does not require tuning.

Other advantages and features will become apparent from the following description and from the claims.

DETAILED DESCRIPTION

Figures 1, 2:
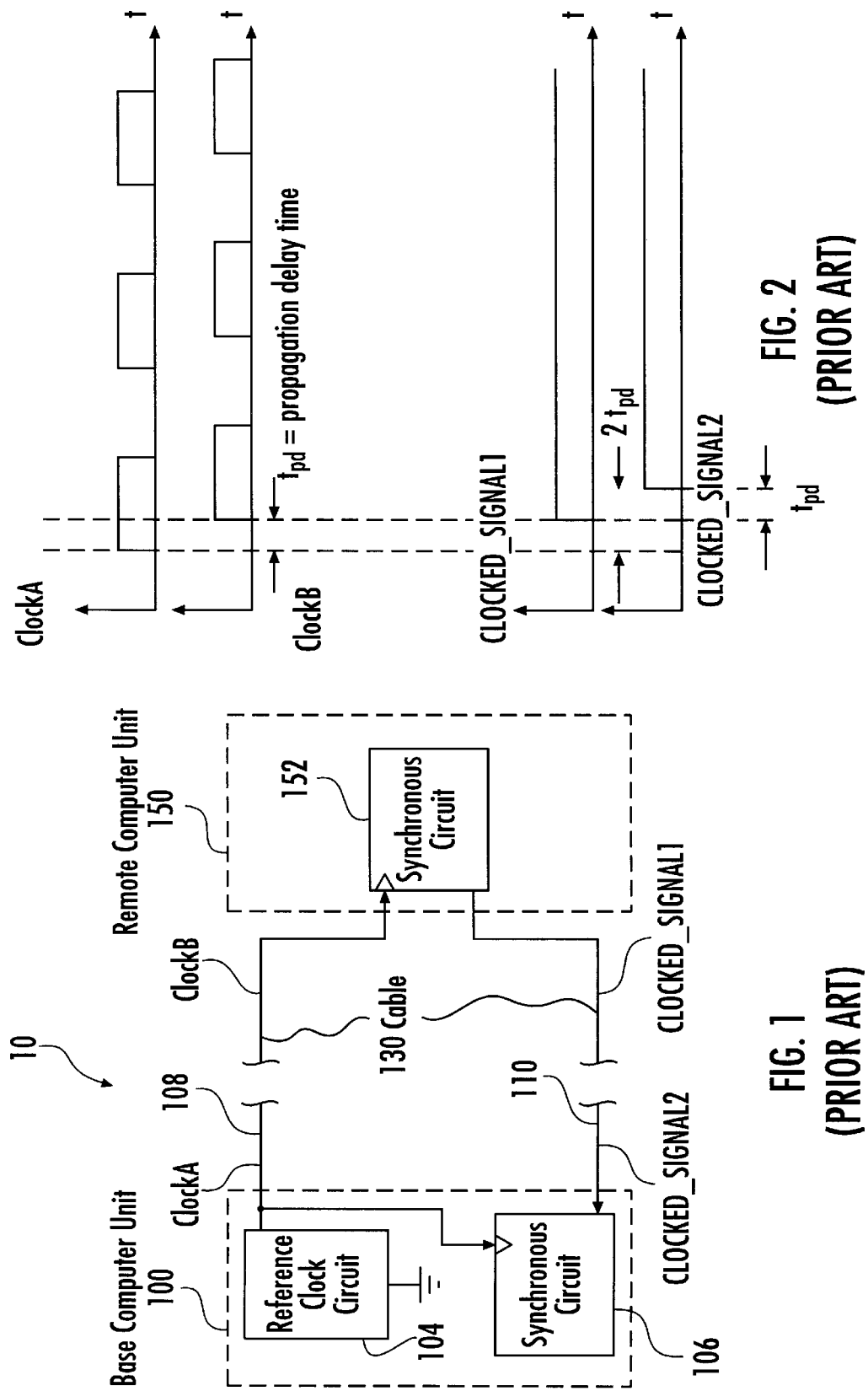
FIG. 1 is a block diagram of a prior art computer system.
FIG. 2 is a timing diagram for the prior art computer system of FIG. 1.
Figure 3:
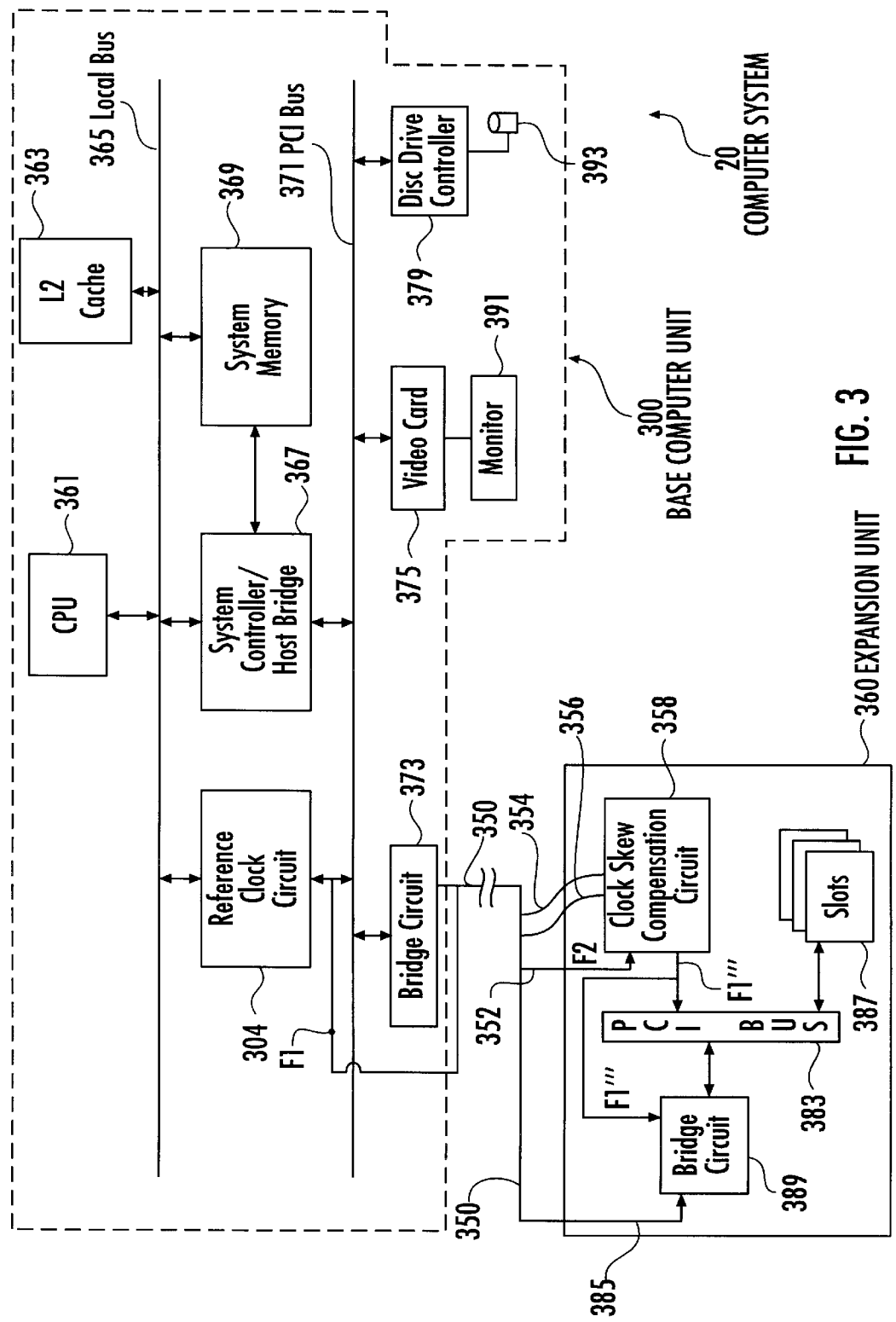
FIG. 3 is a block diagram of a computer system.
Figure 4:
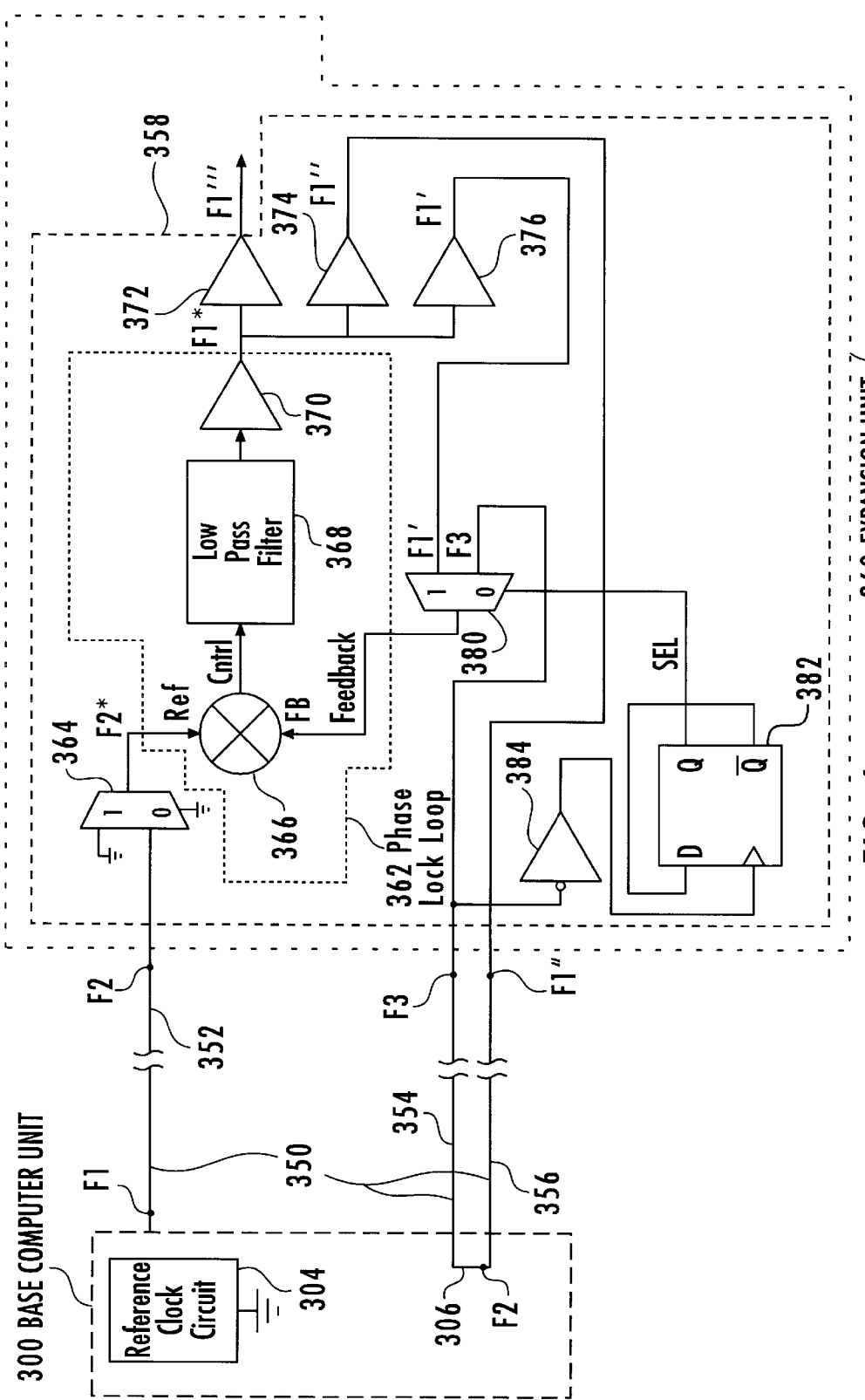
FIG. 4 is a schematic diagram of clock skew compensation circuitry of the computer system shown in FIG. 3.
Figure 5:
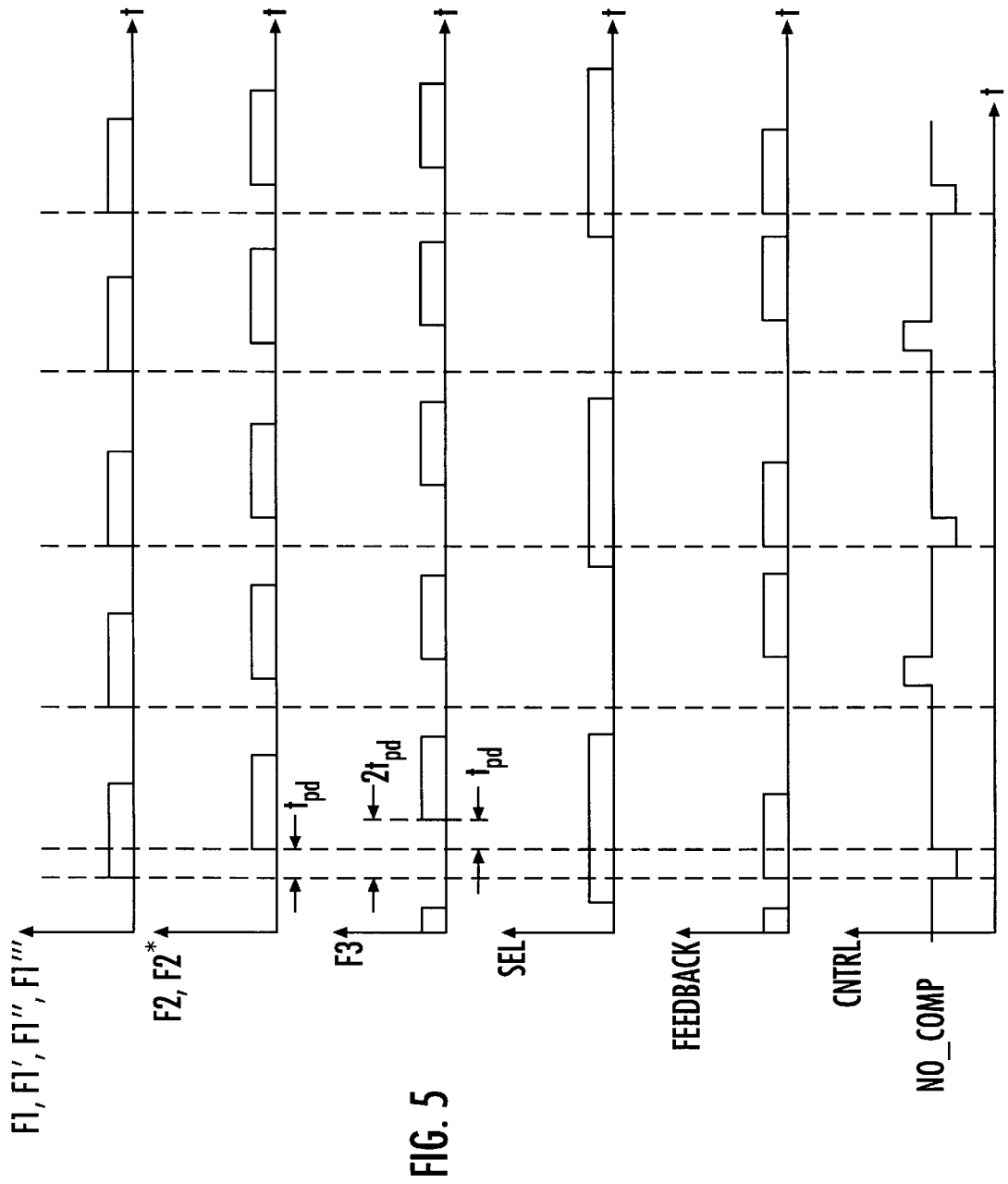
FIG. 5 is a timing diagram for the computer system shown in FIG. 4.

As shown in FIGS. 3–5, in a computer system 20, two clock skew compensation lines 354 and 356 and a clock skew compensation circuit 358 in a remote expansion unit 360 are used to synchronize operations occurring on a Peripheral Component Interconnect (PCI) bus 383 with a reference clock circuit 304 located in a base computer unit 300.

The base computer unit 300 and the expansion unit 360 are electrically connected through a cable 350. The cable 350 includes a clock line 352, the clock skew compensation lines 354 and 356, and lines 385 for transmitting PCI data, address and control signals across the cable 350 between the base computer unit 300 and the expansion unit 360. The expansion unit 360 has expansion card slots 387 coupled to the PCI bus 383.

The base computer unit 300 includes a central processing unit (CPU) 361, a level two (L2) cache 363 and a system memory 369, all of which are coupled to a local bus 365. A system controller/host bridge 367 interfaces the local bus 365 to the system memory 369 and to a PCI bus 371. The reference clock circuit 304 furnishes a clock signal to the local bus 365 and a clock signal F1 to the PCI bus 371. A bridge circuit 373 interfaces the PCI bus 371 to the cable 350. Also coupled to the PCI bus 371 are a video card 375 and a disk drive controller 379. The video card 375 is coupled to a monitor 391, and the disk drive controller 379 is connected to a disk drive 393.

The end of the clock line 352 at the base computer unit 300 receives the clock signal F1, and the end of the clock line 352 at the expansion unit 360 furnishes a clock signal F2 which is equivalent to the clock signal F1 delayed by a propagation delay time $t_{pd}$. The lines 385 of the cable 350 for transmitting PCI data, address and control signals are connected to a bridge circuit 389 which furnishes an interface to the PCI bus 383. The clock skew compensation circuit 358 furnishes a clock signal F1''' to the PCI bus 383 and to the bridge circuit 389 that is in phase with the clock signal F1. The bridge circuit 389 uses the clock signal F1''' to clock the signals transmitted and received across the lines 385.

The goal is to generate the clock signal F1''' on the expansion unit 360 that is synchronized in phase with the clock signal F1, even though there is the propagation delay time $t_{pd}$ that may change, for example, if a new or longer cable 350 is substituted. To achieve this, the desired clock signal F1''' is derived from the propagation delayed clock signal F2 by feeding a clock signal F2* (representative of the signal F2) into the reference input of a phase locked loop 362. The phase locked loop 362 has a feedback input receiving a feedback signal FEEDBACK that is a measure of the actual amount of the propagation delay time $t_{pd}$ on the clock line 352, and the output of the phase locked loop 362 is passed through a buffer 372 to form the desired clock signal F1'''. For purposes of furnishing feedback clock signals (F1'' and F1') that are in phase with the signal F1''', a buffer 374 furnishes the signal F1'', and a buffer 376 furnishes the signal F1'. All three buffers 372–376 introduce approximately the same propagation delay.

The feedback signal FEEDBACK is generated by a multiplexer 380 effectively as an average of the phases of the clock signal F1 and a clock signal F3. To form the clock signal F3, the clock skew compensation lines 354 and 356 are connected by a conductive line 306 at the base computer unit 300 to form a round trip path for generating the clock signal F3 from a clock signal F1'' that is in phase with the clock signal F1'''. Because the clock signal F3 is always out of phase with the clock signal F1''' by exactly twice the propagation delay time $t_{pd}$ (because of its round trip on the lines 354 and 356), the average of the two furnishes the signal FEEDBACK with the single propagation delay time $t_{pd}$. In a sense, the signal FEEDBACK is a measure of the propagation delay time $t_{pd}$ whose effect is to be eliminated from the phase difference between the signals F2 and F1'''.

The reference input of the phase locked loop 362 receives the clock signal F2* representative of the clock signal F2. The phase locked loop 362 generates the clock signal F1* in response to the averaged feedback signal FEEDBACK that is received at the feedback input of the phase locked loop 362. A clock signal F2' exists on the conductive line 306. Because the clock signals F1 and F1'' are in phase, so are the clock signals F2' and F2.

The clock signal F3 is received by the zero input of a multiplexer 380, and the one input of the multiplexer 380 receives the clock signal F1'. The multiplexer 380 furnishes the averaged feedback signal FEEDBACK to the feedback input of the phase locked loop 362. The clock signal F2 passes through the zero input of a multiplexer 364 to furnish the clock signal F2* to the reference input of the phase locked loop 362. The select and one inputs of the multiplexer 364 are grounded.

The select input of the multiplexer 380 receives a select signal SEL used to alternate the clock signals F1' and F3 that are furnished to the feedback input of the phase locked loop 362. The multiplexer 364 is used to equalize any propagation delay attributable to the multiplexer 380.

The phase locked loop 362 includes a phase detector 366 with the reference input of the phase detector 366 receiving the clock signal F2*, the feedback input of the phase detector 366 receiving the feedback signal FEEDBACK and the output of the phase detector 366 furnishing a control signal CNTRL to the input of a low pass filter 368.

The control signal CNTRL has a no compensation voltage level NO_COMP which is the voltage level of the control signal CNTRL when the clock signal F1* is in phase with the clock signal F1. When the feedback signal FEEDBACK is derived from the clock signal F1', then the phase detector 366 decreases the voltage level of the control signal CNTRL to compensate for the lead time of the FEEDBACK signal. When the feedback signal FEEDBACK is derived from the clock signal F3, then the phase detector 366 increases the voltage level of the CNTRL signal to compensate for the lag time of the FEEDBACK signal.

The output of the low pass filter 368 is furnished to the input of a voltage controlled oscillator 370 which furnishes the clock signal F1*. The control signal CNTRL is sufficiently averaged by the low pass filter 368 so the clock signal F1* furnished by the output of the voltage controlled oscillator 370 has neglible jitter. The clock signal F1* is furnished to the input of the buffer 372 which furnishes the clock signal F1'''. The clock signal F1* is also furnished to the input of a buffer 374 which furnishes the clock signal F1''. The clock signal F1* is further provided to the input of a buffer 376 which furnishes the clock signal F1'.

The select signal SEL is furnished by the non-inverting output of a D-type flip-flop 382. The inverting output of the flip-flop 382 is connected to the signal input of the flip-flop 382. The clock input of the flip-flop 382 is connected to the output of an inverting buffer 384 which receives the clock signal F3.

Figure 6:
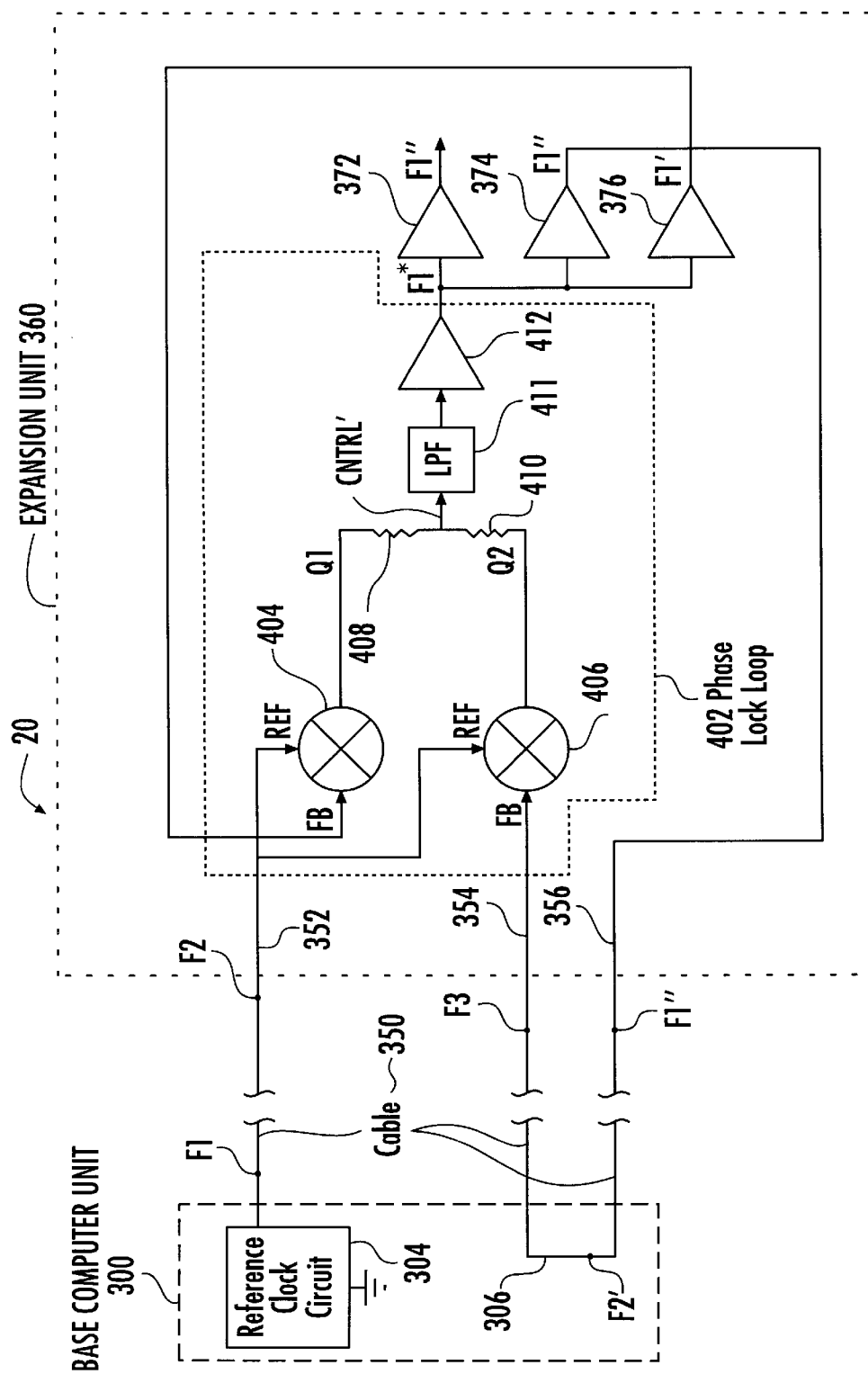
FIG. 6 is a schematic diagram of another clock skew compensation circuitry.
Figure 7:
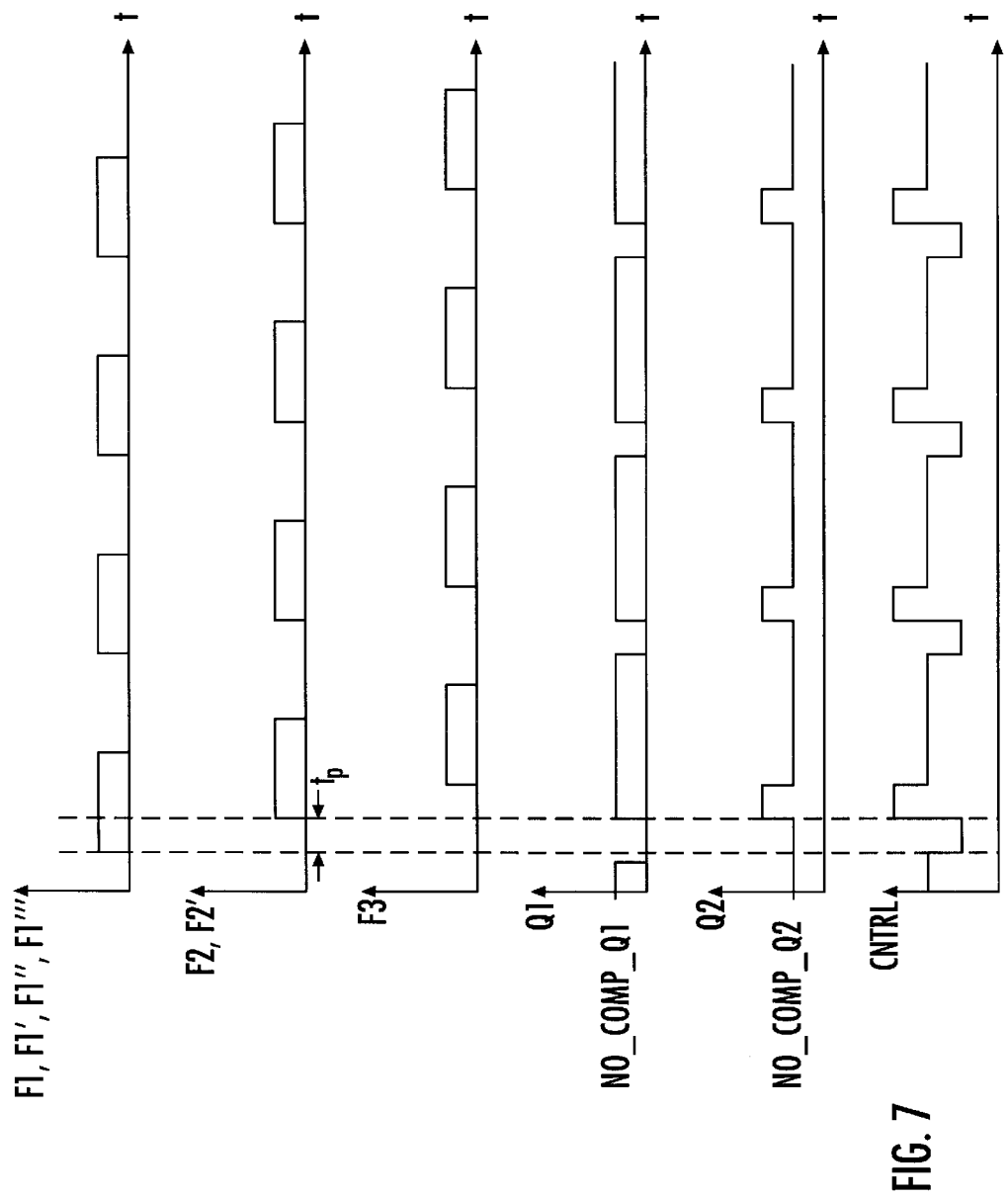
FIG. 7 is a timing diagram for the clock skew compensation circuitry shown in FIG. 6.

Other embodiments are within the scope of the following claims. For example, as shown in FIGS. 6 and 7, a phase locked loop 402 can be used as a substitute for the phase locked loop 362 to furnish phase compensation for longer propagation delay times. Furthermore with the phase locked loop 402, the inverting buffer 384, flip-flop 382, multiplexer 364 and multiplexer 380 are not required. The phase locked loop 402 includes a phase detector 404 that receives the clock signal F2 at its reference input and the clock signal F1' at its feedback input. The output of the phase detector 404 furnishes a signal Q1. The signal Q1 has a no compensation level NO_COMP_Q1 which is the voltage level of the signal Q1 when the signal at the reference input is in phase with the signal at the feedback input of the detector 404. When the phase detector 404 detects that the signal F1' is leading the signal F2 (detects the positive edge of the signal F1' first), the detector 404 momentarily decreases the voltage level of the signal Q1 until the positive edge of the signal F2 is detected.

The phase locked loop 402 further includes a phase detector 406 which receives the clock signal F2 at its reference input. The feedback input of the phase detector 406 receives the clock signal F3. The output of the phase detector 406 furnishes a signal Q2 is phase with the clock signal F1. The signal Q2 has a no compensation level NO_COMP_Q2 which is the voltage level of the signal Q2 when the signal at the reference input is in phase with the feedback input of the phase detector 406. When the phase detector 406 detects that the signal F3 is lagging the signal F2 (detects the positive edge of the F2 signal first), the detector 406 momentarily increases the voltage level of the signal Q2 until the positive edge of the signal F3 is detected. The output of the phase detectors 404 and 406 are connected to two summing resistors 408 and 410 which furnish a combined control signal CNTRL' at their summing junction. The control signal CNTRL' is furnished to the input of a low pass filter 411. The output of the low pass filter 411 is provided to the input of a voltage controlled oscillator 412 which furnishes the clock signal F1*.

Figure 8:
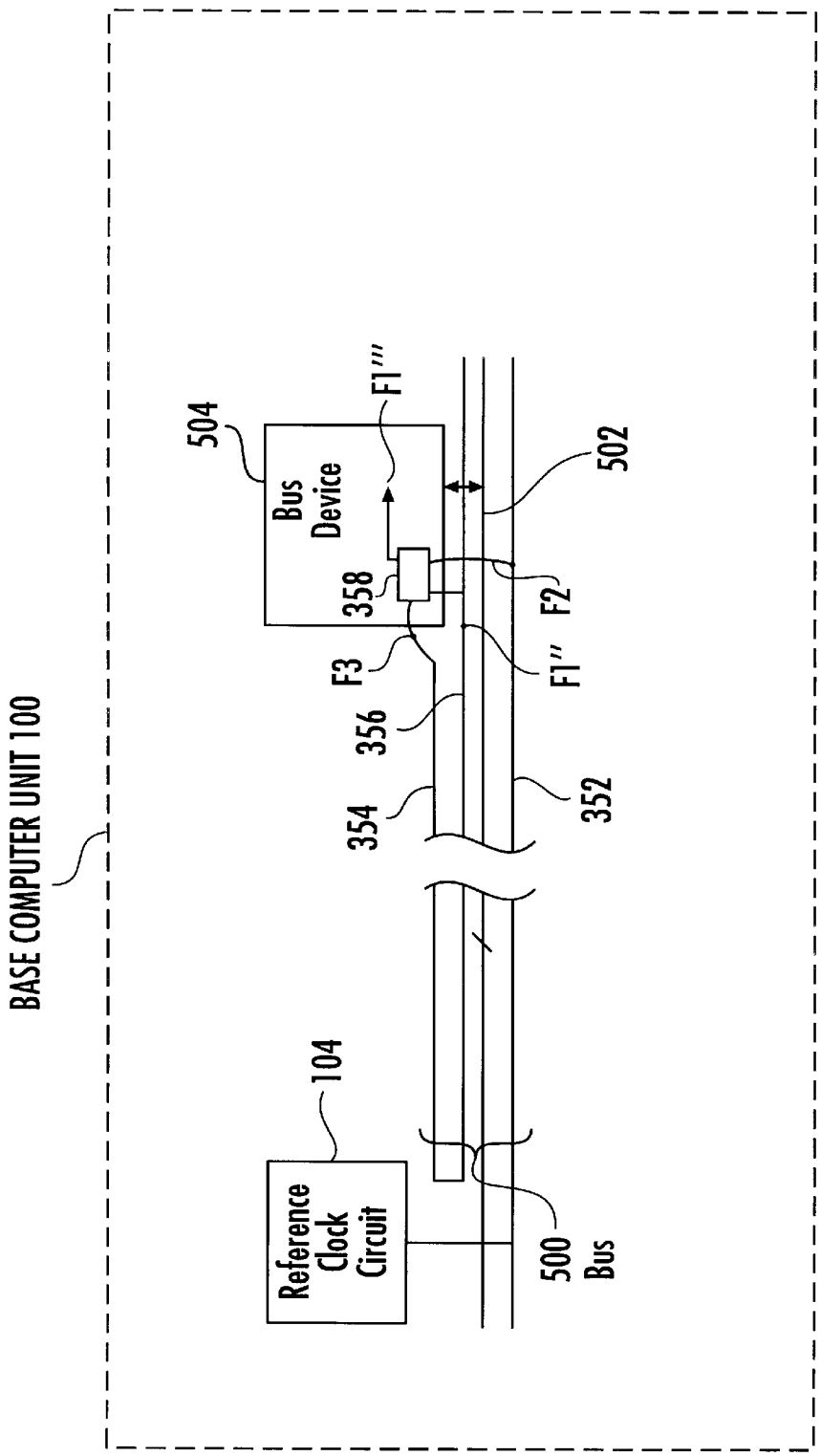
FIG. 8 is a block diagram of a clock circuit and a bus device coupled to a bus.

The synchronization technique may also be used between any two circuits connected in a manner that entails signal propagation delay. For example, as shown in FIG. 8, the clock line 352 is part of a bus 500 having address, data and control lines 502. A bus device 504, coupled to the bus 500, has the clock skew compensation circuit 358 which receives the clock signal F2 and furnishes the clock signal F1''' to circuitry of the bus device 504. The clock skew compensation lines 354 and 356 are also part of the bus 500 and are connected together near the reference clock circuit 104.

What is claimed is:

1. A computer system having a circuit for synchronizing the phase of a first periodic signal in one integrated circuit device with a second periodic signal in another integrated circuit device connected to the one integrated circuit device by a connection that imposes a propagation delay, the system comprising:

a first integrated circuit device including an integrated circuit output coupled to the connection;

a receiver with an input connected to the connection to receive the second periodic signal delayed by the propagation delay;

circuitry for providing a delay signal representative of the propagation delay; and a generator connected to the receiver and to the circuitry for providing, the generator to generate the first periodic signal in phase with the second periodic signal based on the first periodic signal and the delay signal.

2. The computer system of claim 1, wherein the circuitry for providing the delay signal comprises a conductor having a representative propagation delay that is twice the propagation delay.

3. The computer system of claim 2, wherein the conductor is associated with a bus of the computer system.

4. The computer system of claim 1, wherein the generator includes a phase locked loop.

5. The computer system of claim 1, wherein the generator includes an averager which averages a signal formed from the first periodic signal with a signal representative of the delay signal.

6. The computer system of claim 5, wherein the averager includes a multiplexer.

7. The computer system of claim 1, wherein the generator includes a phase locked loop which has a reference input receiving a signal formed from the second periodic signal delayed by the propagation delay and an output providing a signal representative of the first periodic signal.

8. A computer system comprising:

a communication link;

a source device coupled to the communication link to furnish a source timing signal to the communication link, the source timing signal being subject to a first propagation delay caused by the communication link;

a target device connected to receive the source timing signal from the communication link;

circuitry coupled to the communication link to send and receive a second signal along the communication link, the second signal with a second propagation delay that has a predetermined relationship to the first propagation delay; and circuitry connected to the target device to provide the source timing signal to the target device with a timing based on the second propagation delay.

9. The computer system of claim 8, wherein the communication link comprises a bus.

10. The computer system of claim 9, wherein the bus comprises a Peripheral Component Interconnect bus.

11. The computer system of claim 8, wherein the communication link comprises a cable electrically coupled to the source and target devices.

12. The computer system of claim 8 wherein the source device comprises a clock circuit.

13. The computer system of claim 8 wherein the target device comprises a bus.

14. The computer system of claim 13, wherein the bus comprises a Peripheral Component Interconnect bus.

15. The computer system of claim 13, wherein a first conductor having a first length introduces the first propagation delay and the circuitry connected to send and receive the second signal includes a second conductor having a length with a predetermined relationship to the first length.

16. The computer system of claim 15, wherein the first conductor and the second conductor are part of a cable of the computer system.

17. The computer system of claim 15, wherein the first conductor and the second conductor are part of the bus of the computer system.

18. The computer system of claim 8, wherein the circuitry connected to provide the source timing signal includes a phase locked loop.

19. The computer system of claim 8, wherein the circuitry connected to provide the source timing signal to the target device uses an averaging technique on the source timing signal and second signals.

20. The computer system of claim 19, wherein the circuitry connected to provide the source timing signal further includes multiplexer circuitry for averaging signals.

21. A method for use in a computer system for compensating for propagation delay in a signal passed from a signal source to a signal destination, the method comprising:
    sensing an amount of actual time delay indicative of the propagation delay; and
    adjusting the phase of the signal as received from the signal source in accordance with the sensed propagation delay.

22. The method of claim 21, wherein sensing uses a delay channel connected to the signal destination and configured to impart the amount of actual time delay to the signal.

23. The method of claim 22, where the signal source and the signal destination are connected by a communication channel and the delay channel has a propagation delay corresponding to the propagation delay of the communication channel.

24. The method of claim 22, where the signal source and the signal destination are connected by a communication channel and the propagation delay of the delay channel is a multiple of the communication channel's propagation delay.

25. The method of claim 22, where the delay channel comprises a conductor that is connected from the signal destination to the signal source and back to the signal destination.

26. The method of claim 21, wherein adjusting uses a delay sensor to process the phases of two delay signals which appear respectively as an input signal and an output signal to the delay sensor.

27. The method of claim 21, wherein adjusting uses an averaging technique.

28. A circuit for synchronizing the phase of a first periodic signal in one device with a second periodic signal in a second device connected to the first device by a connection that imposes a propagation delay, the circuit comprising:
    a receiver connected to receive the second periodic signal delayed by the propagation delay;
    circuitry for providing a delay signal representative of the propagation delay; and
    a generator coupled to the receiver and the circuitry to generate a compensated periodic signal in phase with the first periodic signal based on the second periodic signal and the delay signal.

29. The circuit of claim 28, wherein the circuitry for providing the delay signal comprises a conductor having a representative propagation delay that is twice the propagation delay.

30. The circuit of claim 28, wherein the conductor is associated with a bus of the circuit.

31. The circuit of claim 28, wherein the generator includes a phase locked loop.

32. The circuit of claim 28, wherein the generator includes an averager which averages a signal formed from the first periodic signal with a signal representative of the delay signal.

33. The circuit of claim 32, wherein the averager includes a multiplexer.

34. The circuit of claim 28, wherein the generator includes a phase locked loop which has a reference input receiving a signal formed from the second periodic signal delayed by the propagation delay and an output providing a signal representative of the first periodic signal.

35. A circuit for synchronizing the phase of a periodic signal in one device with a second periodic signal in a second device connected to the first device by a periodic signal line that imposes a propagation delay, comprising:
    a receiver coupled to the periodic signal line to receive the second periodic signal delayed by the propagation delay;
    a conductor for receiving a signal in phase with the first periodic signal and for providing a delay signal representative of the propagation delay; and
    a phase lock loop coupled to the receiver and to the conductor to generate a compensated periodic signal in phase with the first periodic signal based on the second periodic signal and the delay signal.

36. A system comprising:
    a first integrated circuit device including a signal output node;
    a second integrated circuit device including a compensation circuit having a signal input node and a compensated signal output node; and
    a line coupling the signal output node of the first integrated circuit device to the signal input node of the compensation circuit, the line introducing a propagation delay such that a signal at the signal input node of the compensation circuit will be out of phase with a clock signal at the signal output node of the first integrated circuit device by an amount equal to the propagation delay of the line;
    wherein the compensation circuit provides a compensated signal at the compensated signal output node, the compensated signal being substantially in-phase with the signal at the signal output node of the first integrated circuit device.

37. The system of claim 36 and further comprising a third integrated circuit device with an input coupled to the compensated signal output node of the compensation circuit.

38. The system of claim 37 wherein the third integrated circuit device comprises a bridge circuit coupled between a first bus and a second bus.

39. The system of claim 36 wherein the compensation circuit provides the compensated signal to circuitry of the second integrated circuit device.

40. The system of claim 39 wherein the second integrated circuit device comprises a bus device coupled to the first integrated circuit device through a bus.

41. The system of claim 36 wherein the compensation circuit includes a reference signal output and a reference signal input, the reference signal output coupled to the reference signal input by a reference line that introduces a propagation delay with a known relationship to the propagation delay of the line.

42. The system of claim 41 wherein the reference line introduces a propagation delay that is twice the propagation delay of the line.

43. The system of claim 36 wherein the line comprises a cable.

44. The system of claim 36 wherein the line comprises a bus.

45. The system of claim 44 wherein the line comprises a PCI bus.

46. The system of claim 36 wherein the signal output node of the first integrated circuit comprises a clock signal output node.

47. A computer system comprising:

a CPU;

a memory coupled for access by the CPU;

a reference clock circuit including a clock signal output, the clock signal output being coupled to the CPU;

a compensation circuit having a clock input signal node and a compensated clock signal output node;

a line coupling the clock signal output node of the reference clock to the clock signal input node of the compensation circuit, the line introducing a propagation delay such that a clock signal at the clock signal input node of the compensation circuit will be out of phase with a clock signal at the clock signal output node of the reference clock by an amount equal to the propagation delay of the line; and an integrated circuit device with a clock signal input coupled to the compensated clock signal output node of the compensation circuit, the integrated circuit device receiving a compensated clock signal at the clock signal input, the compensated clock signal being substantially in-phase with the clock signal at the clock signal output node of the reference clock circuit.

48. The system of claim 47 wherein:

the CPU, the memory and the reference clock circuit are disposed in a base computer unit;

the compensation circuit and the integrated circuit device are disposed in an expansion unit; and the expansion unit is coupled to the base computer unit through a cable.

49. The system of claim 47 and further comprising:

a video card coupled for access by the CPU; and a display device coupled to the video card.

50. The system of claim 47 and further comprising:

a disk driver controller coupled for access by the CPU; and a disk drive coupled to the disk driver controller.

51. A circuit comprising:

a phase lock loop with a first input, a second input, and an output, the first input to receive a periodic signal with a first propagation delay;

an averaging circuit with first and second inputs and an output, the first input of the averaging circuit coupled to the output of the phase lock loop, the second input of the averaging circuit coupled to receive a periodic signal with a second propagation delay that has a known relation to the first propagation delay, the output of the averaging circuit coupled to the second input of the phase lock loop.

52. The circuit of claim 51 wherein the averaging circuit comprises a multiplexer.

53. The circuit of claim 51 wherein the phase lock loop comprises a phase detector coupled in series with a low pass filter.

54. A system comprising:

a first integrated circuit including a first integrated circuit output node;

a second integrated circuit including a second integrated circuit input node;

a conductor including a first node coupled to the first integrated circuit output node and a second node, the conductor introducing a propagation delay to a signal being transmitted from the first node of the conductor to the second node of the conductor;

a reference conductor having first and second nodes, the reference conductor introducing a reference propagation delay to a signal being transmitted from the first node of the reference conductor to the second node of the reference conductor, the reference propagation delay being about twice the propagation delay of the conductor; and a compensation circuit disposed physically near to the second integrated circuit, the compensation circuit including a first input node coupled to the first integrated circuit output node, the compensation circuit further including a second input node the first node of the reference conductor, the compensation circuit further including an output node coupled to second integrated circuit input node.

55. The system of claim 54 wherein the conductor comprises a cable.

56. The system of claim 54 wherein the conductor comprises a bus formed on a printed circuit board.

57. The system of claim 54 wherein the compensation circuit is part of the second integrated circuit device.

58. The system of claim 54 wherein the first integrated circuit comprises a reference clock circuit.

* * * * *